US008779403B2

(12) United States Patent
Lee et al.

(10) Patent No.: US 8,779,403 B2
(45) Date of Patent: Jul. 15, 2014

(54) APPARATUS AND METHOD FOR GENERATING EXTREME ULTRA VIOLET RADIATION

(71) Applicants: Samsung Electronics Co., Ltd., Suwon-si (KR); Fine Semitech Corp., Hwaseong-si (KR)

(72) Inventors: Dong-Gun Lee, Hwaseong-si (KR); Eok-Bong Kim, Hwaseong-si (KR); Jong-Ju Park, Hwaseong-si (KR); Seong-Sue Kim, Seoul (KR)

(73) Assignees: Samsung Electronics Co., Ltd., Suwon-si, Gyeonggi-do (KR); Fine Semitech Corp., Hwaseong-si, Gyeonggi-do (KR)

( * ) Notice: Subject to any disclaimer, the term of this patent is extended or adjusted under 35 U.S.C. 154(b) by 0 days.

(21) Appl. No.: 14/103,381

(22) Filed: Dec. 11, 2013

(65) Prior Publication Data

US 2014/0166907 A1 Jun. 19, 2014

(30) Foreign Application Priority Data

Dec. 18, 2012 (KR) ........................ 10-2012-0148235

(51) Int. Cl.
*G01J 1/42* (2006.01)

(52) U.S. Cl.
USPC .................... 250/504 R; 250/492.2; 250/372; 250/493.1; 250/365; 356/450; 356/57

(58) Field of Classification Search
USPC ............... 250/504 R, 492.2, 372, 493.1, 365; 356/450, 57
See application file for complete search history.

(56) References Cited

U.S. PATENT DOCUMENTS

| | | | | |
|---|---|---|---|---|
| 6,968,038 | B2 | 11/2005 | Nam et al. | |
| 8,009,350 | B2 | 8/2011 | Kim et al. | |
| 2010/0284064 | A1 | 11/2010 | Kruizinga et al. | |
| 2011/0140009 | A1 | 6/2011 | Kaertner | |
| 2013/0028273 | A1 * | 1/2013 | Lee et al. | 372/5 |
| 2013/0056642 | A1 * | 3/2013 | Lee et al. | 250/372 |

FOREIGN PATENT DOCUMENTS

| | | | |
|---|---|---|---|
| JP | 2005-017045 | A | 1/2005 |
| JP | 2008-070472 | A | 3/2008 |
| KR | 10-2010-0104234 | A | 9/2010 |
| KR | 10-2011-0095084 | A | 8/2011 |

* cited by examiner

*Primary Examiner* — Jack Berman
*Assistant Examiner* — Meenakshi Sahu
(74) *Attorney, Agent, or Firm* — Lee & Morse, P.C.

(57) ABSTRACT

An apparatus and a method for generating extreme ultra violet radiation are provided. The apparatus for generating extreme ultra violet radiation includes a light source, a first reflecting mirror on which source light emitted from the light source is incident, a second reflecting mirror on which first reflected light reflected by the first reflecting mirror is incident, a focus mirror on which second reflected light reflected by the second reflecting mirror is incident, the focus mirror reflecting third reflected light back to the second reflecting mirror, and a gas cell on which fourth reflected light reflected by the second reflecting mirror is incident.

15 Claims, 7 Drawing Sheets

APPARATUS AND METHOD FOR GENERATING EXTREME ULTRA VIOLET RADIATION

CROSS-REFERENCE TO RELATED APPLICATION

Korean Patent Application No. 10-2012-0148235, filed on Dec. 18, 2012, in the Korean Intellectual Property Office, and entitled: "Apparatus and Method for Generating Extreme Ultra Violet Radiation," is incorporated by reference herein in its entirety.

BACKGROUND

1. Field

Embodiments relate to an apparatus and a method for generating extreme ultra violet radiation.

2. Description of the Related Art

An interferometer is a system which splits light emitted from a light source into two or more beams, creates an optical path length difference between the two or more beams, and observes interfering patterns produced when the split beams recombine. Interferometers are used to measure wavelengths, accurately compare lengths or distances, or compare optical distances. In recent years, the interferometer is also used to inspect surface quality of an optical system.

An extreme ultra violet (EUV) light region is a shorter-wavelength region than a visible light region, and EUV light may improve resolution where diffraction is limited by the magnitude of wavelengths in light-based ultra precision metrology. In addition, if a highly coherent light source can be produced, a wide variety of applications using light interference and diffraction can be achieved.

Since coherence of a high-harmonic EUV light source is superior to that of other types of EUV light source, the high-harmonic EUV light source is used as a light source of a EUV interferometer or a EUV scanning microscope. High-harmonic generation is performed such that a high electric field varying with time is applied to inert gas, such as Ar, Ne or Xe, to ionize electrons to then be moved along the trajectory. The electrons are recombined to then generate light in an EUV band with energy corresponding to a sum of ionized energy and electronic motion energy.

SUMMARY

One or more embodiments is directed to providing an apparatus for generating extreme ultra violet radiation, including a light source, a first reflecting mirror on which source light emitted from the light source is incident, a second reflecting mirror on which first reflected light reflected by the first reflecting mirror is incident, a focus mirror on which second reflected light reflected by the second reflecting mirror is incident, the focus mirror reflecting third reflected light back to the second reflecting mirror, and a gas cell on which fourth reflected light reflected by the second reflecting mirror is incident.

The apparatus may include a first position sensor which senses a change in a position of first transmitted light generated when some of the first reflected light is transmitted through the second reflecting mirror, a second position sensor which senses a change in a position of second transmitted light generated when some of the third reflected light is transmitted through the second reflecting mirror, a first position adjusting apparatus configured to adjust the position of the first reflecting mirror, and a second position adjusting apparatus configured to adjust the position of the focus mirror.

An output of the first position sensor may control the second position adjusting apparatus and an output of the second position sensor may control the first position adjusting apparatus.

The first and second position sensors may be positioned behind the second reflecting mirror.

The apparatus may include a position sensor which senses a change in a position of transmitted light generated when some light incident on the second reflecting mirror is transmitted therethrough, and a position adjusting apparatus configured to adjust the position at least one of the first reflecting mirror and the focus mirror in response to an output of the position sensor.

The light source emits a laser beams and the laser beam interacts with gas in the gas cell to emit extreme ultra violet radiation.

The gas may include one or more of Ne, Ar, Kr and Xe.

One or more embodiments is directed to providing an apparatus for generating extreme ultra violet radiation, including a reflecting mirror which receives light and provides reflected light forward and transmitted light rearward, a focus mirror which receives the reflected light, and a position sensor which receives the transmitted light.

The apparatus may include a position adjusting apparatus which is formed to adjust the position of the focus mirror.

The position sensor controls the position adjusting apparatus.

One or more embodiments is directed to providing an optical system for an apparatus for generating extreme ultra violet radiation, the optical system being between a light source and a gas cell, the optical system directing light from the light source onto the gas cell, the optical system including at least one reflecting mirror, and at least one focus mirror, wherein light incident on the gas cell has only been reflected in the optical system.

The optical system may include a position sensor that receives light transmitted from the at least one reflecting mirror.

The optical system may include a position adjusting apparatus configured to adjust a position of at least one of the at least one reflecting mirror and at least one focus mirror in accordance with an output of the position sensor.

One or more embodiments is directed to providing a method for generating extreme ultra violet radiation, the method including directing source light emitted from a light source onto a first reflecting mirror, reflecting first reflected light from the first reflecting mirror, directing the first reflected light onto a second reflecting mirror, reflecting second reflected light from the second reflecting mirror, directing the second reflected light onto a focus mirror, reflecting third reflected light from the focus mirror, directing the third reflected light onto the second reflecting mirror, reflecting fourth reflected light from the second reflecting mirror, and directing the fourth reflected light onto a gas cell.

The method may include sensing a change in a position of first transmitted light generated when some of the first reflected light is transmitted through the second reflecting mirror, sensing a change in a position of second transmitted light generated when some of the third reflected light is transmitted through the second reflecting mirror, adjusting a position of the first reflecting mirror in accordance with the change in the position of at least one of the first transmitted light and the second transmitted light, and adjusting a position of the focus mirror in accordance with the change in the position of at least one of the first transmitted light and the second transmitted light.

The method may include adjusting the position of the first reflecting mirror in accordance with the change in the position of the second transmitted light, and adjusting the position of the focus mirror in accordance with the change in the position of the first transmitted light.

One or more embodiments is directed to providing a method for generating extreme ultra violet radiation, the method including directing light onto a reflecting mirror, reflecting light from the reflecting mirror forward and transmitting light from the reflecting mirror rearward, directing the reflected light onto a focus mirror, and directing the transmitted light onto a position sensor.

The method may include adjusting the position of the focus mirror using a position adjusting apparatus.

The method may include controlling the position adjusting apparatus using an output of the position sensor.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Figure 1:
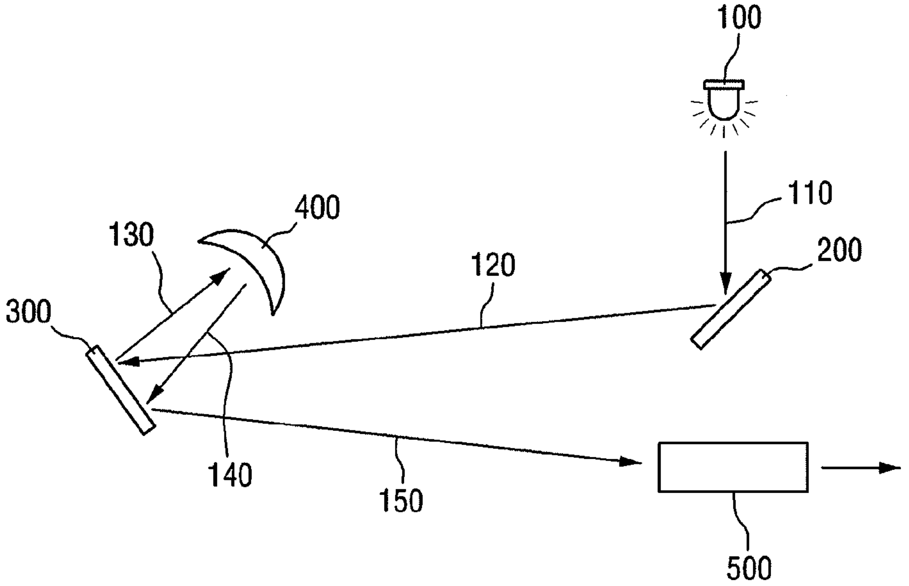
FIG. 1 illustrates an apparatus for generating extreme ultra violet radiation according to an embodiment.

FIG. 1 illustrates an apparatus for generating extreme ultra violet radiation according to an embodiment. Referring to FIG. 1, the apparatus for generating extreme ultra violet radiation according to an embodiment may include a light source 100, a first reflecting mirror 200, a second reflecting mirror 300, a focus mirror 400, and a gas cell 500.

The light source 100 emits source light 110 (e.g., laser beam) to the first reflecting mirror 200. The light source 100 may be, for example, a femtosecond laser. In particular, the light source 100 may be a Ti: Sapphire femtosecond laser or an yttrium lithium fluoride (Nd: YLF) femtosecond laser.

In particular, the light source 110 may be a titanium doped sapphire (Ti: Sapphire) femtosecond laser or an yttrium lithium fluoride (Nd: YLF) femtosecond laser. The femtosecond laser is produced based on a mode-locking principle. The mode-locking means a phenomenon that phases between modes become consistent with each other. The femtosecond laser has $10^5$ to $10^6$ resonance modes, in which phases become consistent with each other at a certain moment to cause constructive interference, thereby generating ultrashort pulses. In particular, the Ti: Sapphire femtosecond laser has a bandwidth of about 100 nm at a central wavelength of 800 nm and generates ultrashort pulses of 9.41 [fs] based on Gaussian pulses.

The source light 110 emitted from the light source 100 reaches the first reflecting mirror 200, which reflects first reflected light 120. The first reflecting mirror 200 may be positioned at a constant angle, and reflects the source light 110 emitted from the light source 100 towards the second reflecting mirror 300.

The first reflected light 120 reflected by the first reflecting mirror 200 reaches the second reflecting mirror 300, which reflects second reflected light 130. Unlike in the general extreme ultra violet radiation generating apparatus, using a plane mirror, e.g., the second reflecting mirror 300, instead of a beam splitter, since more than 99% of the first reflected light 120 is reflected from a surface of the second reflecting mirror 300, the amount of light of the second reflected light 130 reaching the focus mirror 400 may be increased, thereby improving the efficiency of generating extreme ultra violet radiation.

Additionally, since, when using a plane mirror instead of a beam splitter, waveforms of laser beams are affected only by the reflecting surface of the second reflecting mirror 300, wavefront distortions of laser beams may be reduced. For example, when the extreme ultra violet radiation is generated using light transmitted through a beam splitter, the light may be affected by non-uniformity of both surfaces of the beam splitter. However, when the extreme ultra violet radiation is generated using light reflected by the second reflecting mirror 300, the light may be affected only by non-uniformity of the reflecting surface of the second reflecting mirror 300, thereby reducing wavefront distortion and improving the efficiency of generating extreme ultra violet radiation.

Further, in the conventional extreme ultra violet radiation generating apparatus, in order to reduce the wavefront distortion of the transmitted light, a beam splitter should be thin. The beam splitter should be thin, since when light is transmitted through a thick medium, a pulsewidth of the light transmitted increases compared to light not transmitted through the thick medium, resulting in a reduction in the efficiency of generating extreme ultra violet radiation. In contrast, in the apparatus for generating extreme ultra violet radiation according to the embodiment, non-uniformity of a surface opposite to the reflecting surface of the second reflecting mirror 300 insubstantially affects the wavefront distortion of the reflected laser beam. The second reflecting mirror 300 may be formed to have a larger thickness than a conventional beam splitter. If the second reflecting mirror 300 is fabricated, irrespective of the thickness of the second reflecting mirror 300, the surface uniformity of the reflecting surface of the second reflecting mirror 300 may be increased.

The second reflected light 130 reflected by the second reflecting mirror 300 reaches the focus mirror 400, which reflects third reflected light 140. The focus mirror 400 focuses the second reflected light 130 as the third reflected light 140 back onto the second reflecting mirror 300. The second reflecting mirror 300 reflects fourth reflected light 150 onto to the gas cell 500.

The gas cell 500 is provided at a position to receive the fourth reflected light 150 reflected by the second reflecting mirror 300. The gas cell 500 may include inert gas, for example, at least one of Ne, Ar, Kr and Xe. The fourth reflected light 150 having reached the gas cell 500 and the inert gas present in the gas cell 50 may interact with each other, thereby indirectly generating extreme ultra violet radiation.

Figure 2:
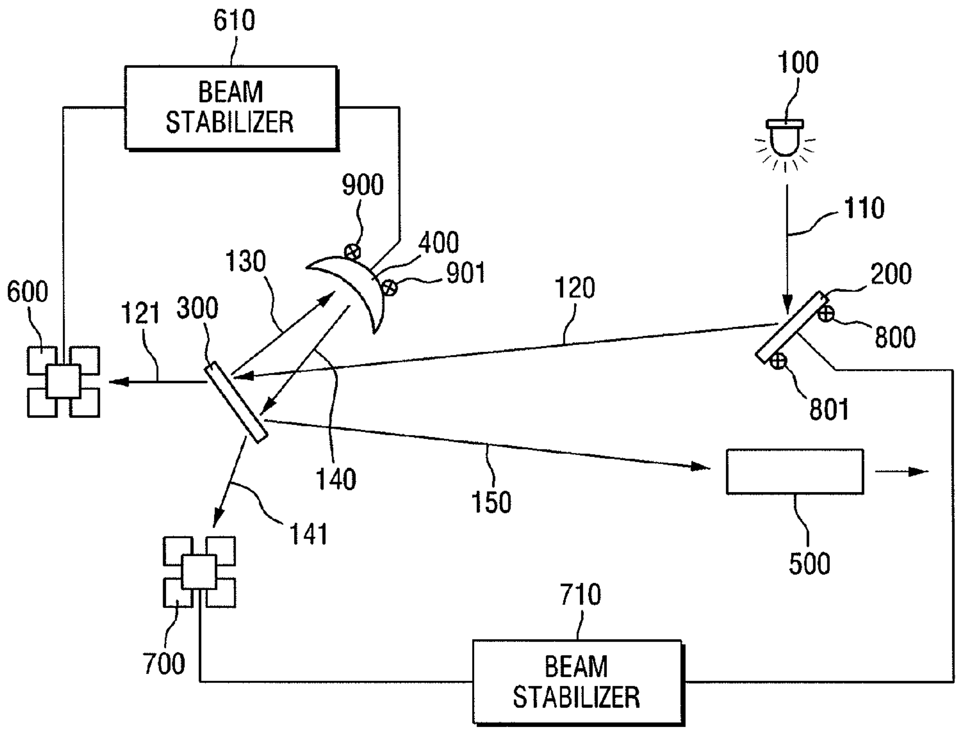
FIG. 2 illustrates an apparatus for generating extreme ultra violet radiation according to another embodiment.

FIG. 2 illustrates an apparatus for generating extreme ultra violet radiation according to another embodiment. For the sake of convenient explanation, the following description will focus on differences between the apparatuses for generating extreme ultra violet radiation according to the present and previous embodiments.

Referring to FIG. 2, the apparatus for generating extreme ultra violet radiation according to another embodiment may further include a first position sensor 600, a second position sensor 700, first position adjusting apparatuses 800 and 801, and second position adjusting apparatuses 900 and 901, compared to the apparatus according to the previous embodiment.

The first position sensor 600 may be provided at a position where a change in the position of first transmitted light 121 generated when some of first reflected light 120 is transmitted through the second reflecting mirror 300 may be sensed. Since the second reflecting mirror 300 is formed of a medium having low transmissivity, only some of the first reflected light 120 is transmitted through the second reflecting mirror 300 to then reach the first position sensor 600. For example, the first transmitted light 121 generated when the first reflected light 120 is transmitted through the second reflecting mirror 300 may be 1% or less of the amount of the first reflected light 120.

The second position sensor 700 may be provided at a position where a change in the position of second transmitted light 141 generated when some of third reflected light 140 is transmitted through the second reflecting mirror 300 may be sensed. As described above, the second transmitted light 141 may be 1% or less of the amount of the third reflected light 140. However, embodiments are not limited thereto. For example, additional position sensors may further be provided.

The first position adjusting apparatuses 800 and 801 may be formed to adjust the position of the first reflecting mirror 200. For example, the first position adjusting apparatuses 800 and 801 may be formed on a surface opposite to a reflecting surface of the first reflecting mirror 200. One or more of the first position adjusting apparatuses 800 and 801 may be provided. In the embodiment illustrated in FIG. 3, two of the first position adjusting apparatuses 800 and 801 are provided. The first position adjusting apparatuses 800 and 801 may adjust the angle of the first reflecting mirror 200 based on the changes in the direction and position of the second transmitted light 141 sensed by the second position sensor 700. In the apparatus for generating extreme ultra violet radiation according to the embodiment, in order to increase the efficiency of generating extreme ultra violet radiation, an amount of the fourth reflected light 150 reaching the gas cell 500 should be increased. The first position adjusting apparatuses 800 and 801 may adjust the angle of the first reflecting mirror 200 to allow the first reflected light 120 to reach the optimum position of the first reflecting mirror 200. In particular, a second beam stabilizer 710 may be provided between the second position sensor 700 to control the first position adjusting apparatuses 800 and 801 in accordance with an output of the second position sensor 700.

The second position adjusting apparatuses 900 and 901 may be formed to adjust the position of the focus mirror 400. For example, the second position adjusting apparatuses 900 and 901 may be formed on a surface opposite to a reflecting surface of the focus mirror 400. One or more of the second position adjusting apparatuses 900 and 901 may be provided. In the embodiment illustrated in FIG. 3, two of the second position adjusting apparatuses 900 and 901 are provided. The second position adjusting apparatuses 900 and 901 may adjust the angle of the focus mirror 400 based on the changes in the direction and position of the first transmitted light 121 sensed by the first position sensor 600. In the apparatus for generating extreme ultra violet radiation according to the embodiment, in order to increase the efficiency of generating extreme ultra violet radiation, it is necessary to increase the amount of the fourth reflected light 150 reaching the gas cell 500. The second position adjusting apparatuses 900 and 901 may adjust the angle of the focus mirror 400 to allow the third reflected light 140 to reach the optimum position of the focus mirror 400. In particular, a first beam stabilizer 610 may be provided between the first position sensor 600 to control the first position adjusting apparatuses 900 and 901 in accordance with an output of the first position sensor 600.

Figure 3:
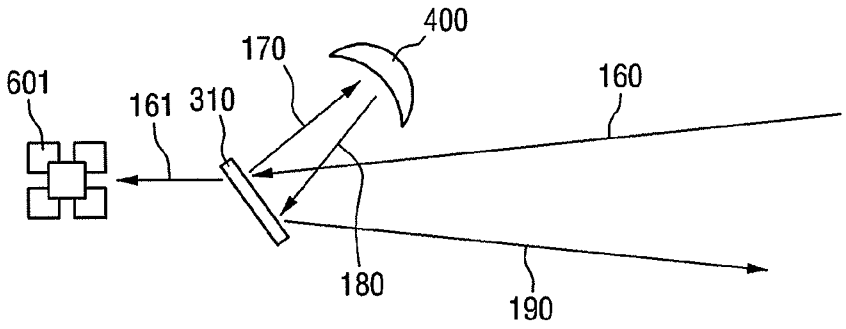
FIG. 3 illustrates an apparatus for generating extreme ultra violet radiation according to still another embodiment.
Figure 4:
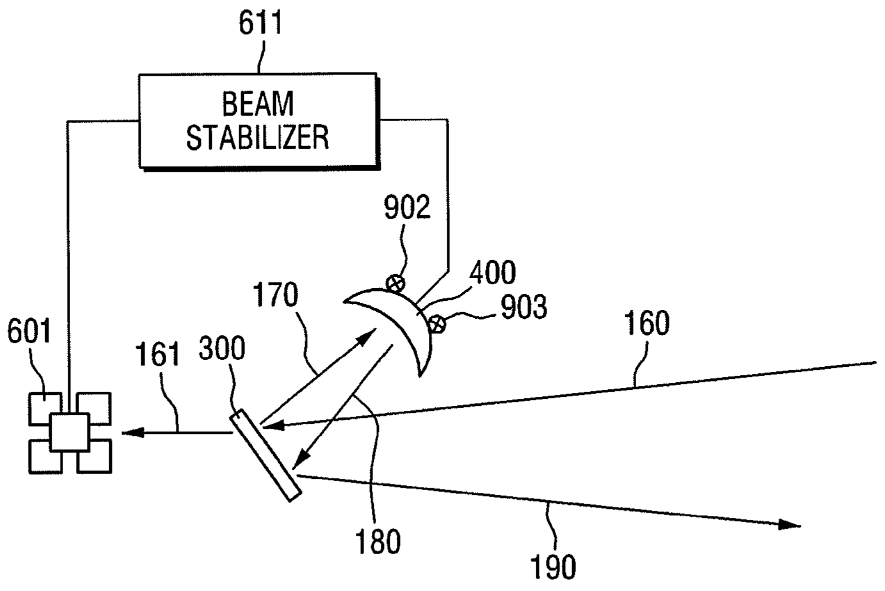
FIG. 4 illustrates an apparatus for generating extreme ultra violet radiation according to still another embodiment.

FIG. 3 illustrates an apparatus for generating extreme ultra violet radiation according to still another embodiment. FIG. 4 illustrates an apparatus for generating extreme ultra violet radiation according to still another embodiment. For the sake of convenient explanation, the following description and drawings will focus on differences between the apparatuses for generating extreme ultra violet radiation according to the present and previous embodiments.

Referring to FIG. 3, the apparatus for generating extreme ultra violet radiation according to still another embodiment may include a reflecting mirror 310, the focus mirror 400, and a position sensor 601.

Fifth reflected light 160, i.e., light reflected from the mirror 200, reaches the reflecting mirror 310, which reflects sixth reflected light 170. When using a plane mirror, e.g., the reflecting mirror 310, instead of a beam splitter, since more than 99% of the fifth reflected light 160 may be reflected from a surface of the reflecting mirror 310, the amount of light of sixth reflected light 170 reaching the focus mirror 400 may be increased, thereby improving the efficiency of generating extreme ultra violet radiation.

The sixth reflected light 170 reflected by the reflecting mirror 310 reaches the focus mirror 400, which reflects seventh reflected light 180. The focus mirror 400 focuses the sixth reflected light 170 as seventh reflected light 180 back onto the reflecting mirror 310. The reflecting mirror 310 reflects again eighth reflected light 190.

The position sensor 601 may be provided at a position where a change in the position of third transmitted light 161 generated when some of fifth reflected light 160 is transmitted through the reflecting mirror 310 may be sensed. Since the reflecting mirror 310 is formed of a medium having low transmissivity, only some of the fifth reflected light 160 is transmitted through the reflecting mirror 310 to then reach the position sensor 601. For example, the third transmitted light 161 generated when the fifth reflected light 160 is transmitted through the reflecting mirror 310 may be 1% or less of the amount of the fifth reflected light 160.

Referring to FIG. 4, the apparatus for generating extreme ultra violet radiation according to still another embodiment may further include position adjusting apparatus 902 and 903, compared to the apparatus according to the previous embodiment.

The position adjusting apparatus 902 and 903 may be formed to adjust the position of the focus mirror 400. For example, the position adjusting apparatus 902 and 903 may be formed on a surface opposite to a reflecting surface of the focus mirror 400. One or more of the position adjusting apparatus 902 and 903 may be provided. In the embodiment illustrated in FIG. 4, two of the position adjusting apparatus 902 and 903 are provided. The position adjusting apparatus 902 and 903 may adjust the angle of the focus mirror 400 based on the changes in the direction and position of the third transmitted light 161 sensed by the position sensor 601. In particular, a beam stabilizer 611 may be provided between the position sensor 601 to control the position adjusting apparatuses 902 and 903 in accordance with an output of the position sensor 601.

Figure 5:
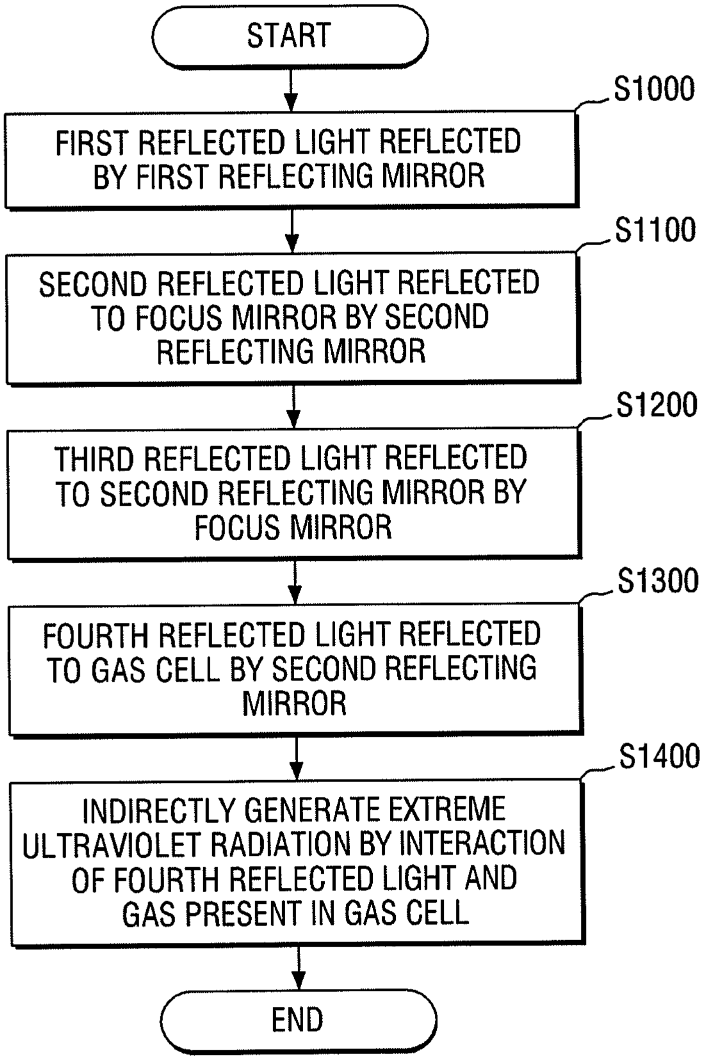
FIG. 5 illustrates a flowchart of a method for generating extreme ultra violet radiation according to an embodiment.
Figure 6:
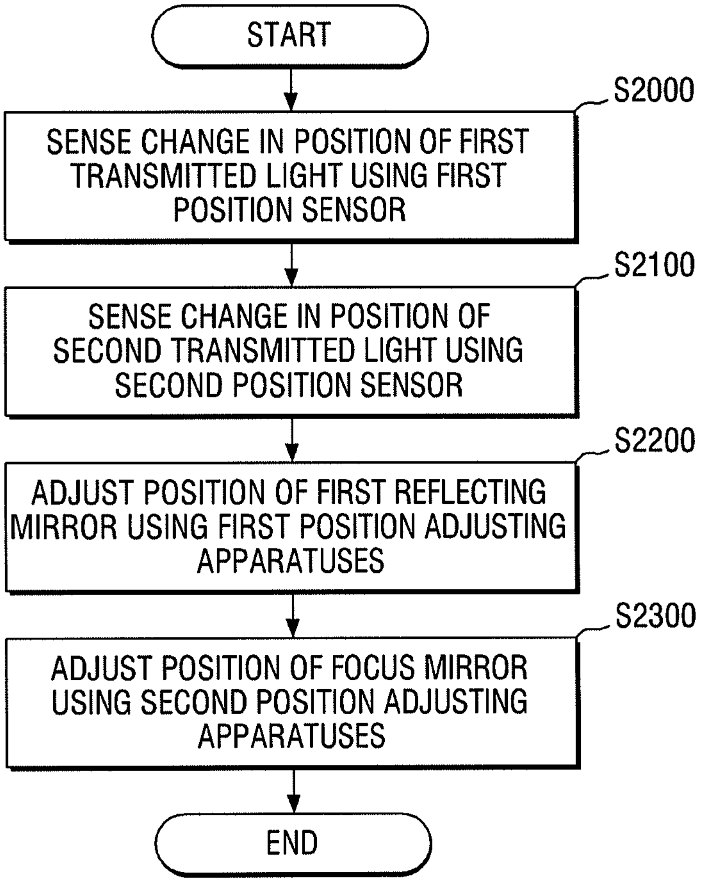
FIG. 6 illustrates a flowchart of a method for generating extreme ultra violet radiation according to another embodiment.
Figure 7:
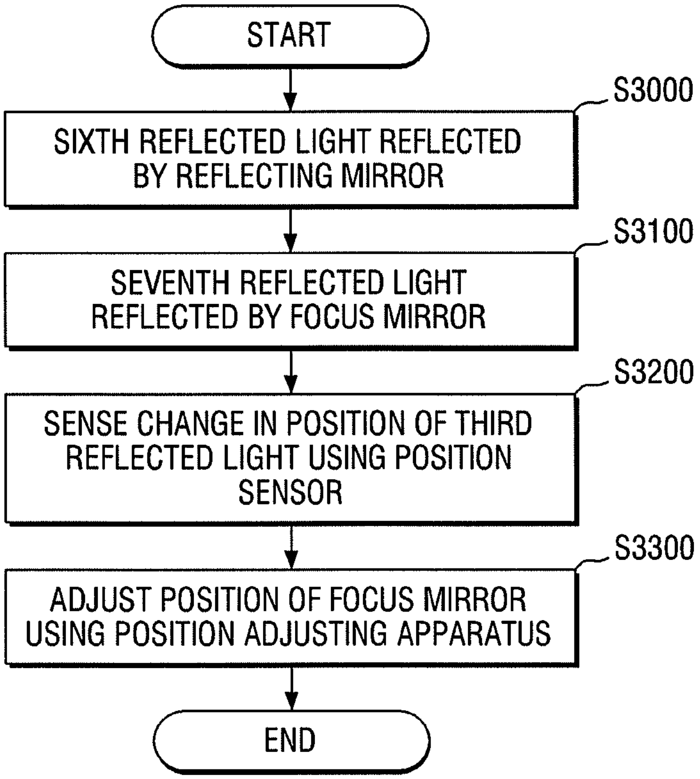
FIG. 7 illustrates a flowchart of a method for generating extreme ultra violet radiation according to still another embodiment.

FIG. 5 illustrates a flowchart of a method for generating extreme ultra violet radiation according to an embodiment. FIG. 6 illustrates a flowchart of a method for generating extreme ultra violet radiation according to another embodiment. FIG. 7 illustrates a flowchart of a method for generating extreme ultra violet radiation according to still another embodiment.

Hereinafter, the method for generating extreme ultra violet radiation according to an embodiment will be described with reference to FIGS. 2 and 6.

The light source 100 emits the source light 110 to the first reflecting mirror 200, and the first reflected light 120 is reflected by the first reflecting mirror 200 (S1000). The source light 110 may be, for example, a femtosecond laser beam. In particular, the source light 110 may be a titanium doped sapphire (Ti: Sapphire) femtosecond laser beam or an yttrium lithium fluoride (Nd: YLF) femtosecond laser beam.

The first reflecting mirror 200 may be positioned at a predetermined angle, so that the source light 110 emitted from the light source 100 may be reflected to the second reflecting mirror 300.

The second reflected light 130 is reflected to the focus mirror 400 by the second reflecting mirror 300 (S1100). The second reflecting mirror 300 is formed of a medium having low transmissivity, e.g., such that more than 99% of light is reflected to the focus mirror 400. That is to say, little light is transmitted through the second reflecting mirror 300, and the second reflected light 130 is reflected from a reflecting surface of the second reflecting mirror 300.

The second reflected light 130 reaches the focus mirror 400, and the third reflected light 140 is again reflected to the second reflecting mirror 300 by the focus mirror 400 (S1200). The fourth reflected light 150 is directed toward the gas cell 500 by the second reflecting mirror 300 (S1300).

The fourth reflected light 150 reaches the gas cell 500, and inert gas is present in the gas cell 500. The fourth reflected light 150 reaching the gas cell 500 and the inert gas may interact with each other, thereby indirectly generating extreme ultra violet radiation (S1400). The inert gas may include, for example, at least one of Ne, Ar, Kr and Xe.

A method for generating extreme ultra violet radiation according to another embodiment will be described with reference to FIGS. 2 and 6. For the sake of convenient explanation, the following description will focus on differences between the methods for generating extreme ultra violet radiation according to the present and previous embodiments.

The method for generating extreme ultra violet radiation according to another embodiment may include sensing a change in the position of the first transmitted light 121 generated when some of the first reflected light 120 is transmitted through the second reflecting mirror 300 using the first position sensor 600 (S2000). Since the second reflecting mirror 300 is formed of a medium having low transmittivity, only some of the first reflected light 120 is transmitted through the second reflecting mirror 300 to then reach the first position sensor 600. For example, the first transmitted light 121 generated when the first reflected light 120 is transmitted through the second reflecting mirror 300 may be 1% or less of the amount of the first reflected light 120.

A change in the position of the second transmitted light 141 generated when some of the third reflected light 140 is transmitted through the second reflecting mirror 300 is sensed using the second position sensor 700 (S2100). The second transmitted light 141 may be 1% or less of the amount of the third reflected light 140.

The position of the first reflecting mirror 200 is adjusted using first position adjusting apparatuses 800 and 801 (S2200). The angle of the first reflecting mirror 200 is adjusted based on the changes in the direction and position of the second transmitted light 141, sensed by the second position sensor 700 using the first position adjusting apparatuses 800 and 801. That is to say, the angle of the first reflecting mirror 200 is adjusted to allow the first reflected light 120 to reach the optimum position of the first reflecting mirror 200 using the first position adjusting apparatuses 800 and 801.

The position of the focus mirror 400 is adjusted using the second position adjusting apparatuses 900 and 901 (S2300). The angle of the focus mirror 400 is adjusted based on the changes in the direction and position of the first transmitted light 121, sensed by the first position sensor 600 using the second position adjusting apparatuses 900 and 901. That is to say, the angle of the focus mirror 400 is adjusted to allow the third reflected light 140 to reach the optimum position of the focus mirror 400 using the second position adjusting apparatuses 900 and 901.

The method illustrated in FIG. 6 may be used before, after, or during the method of FIG. 5.

A method for generating extreme ultra violet radiation according to still another embodiment will be described with reference to FIGS. 3, 4, and 7. For the sake of convenient explanation, the following description will focus on differences between the methods for generating extreme ultra violet radiation according to the present and previous embodiments.

The fifth reflected light 160 reaches the reflecting mirror 310 and the sixth reflected light 170 is reflected through the reflecting mirror 310 (S3000). The reflecting mirror 310 may be positioned at a constant angle, and the sixth reflected light 170 may be reflected to the focus mirror 400.

The sixth reflected light 170 reaches the focus mirror 400, and the seventh reflected light 180 is again reflected to the reflecting mirror 310 through the focus mirror 400 (S3100). The eighth reflected light 190 is again reflected through the reflecting mirror 310.

A change in the position of the third transmitted light 161 generated when some of the fifth reflected light 160 is transmitted through the reflecting mirror 310 is sensed using the position sensor 601 (S3200). The third transmitted light 161 may be 1% or less of the amount of the fifth reflected light 160.

The position of the focus mirror 400 is adjusted using the position adjusting apparatuses 902 and 903 (S3300). The angle of the focus mirror 400 is adjusted based on the changes in the direction and position of the third transmitted light 161, sensed by the first position sensor 601 using the position adjusting apparatuses 902 and 903. That is to say, the angle of the focus mirror 400 is adjusted to allow the reflected light 180 to reach the optimum position of the focus mirror 400 using the second position adjusting apparatuses 902 and 903.

The method illustrated in FIG. 7 may be used before, after, or during the method of FIG. 5.

By way of summation and review, embodiments are directed to providing an apparatus, optical system, and method for generating extreme ultra violet radiation, which has enhanced performance of a light source by improving a laser beam focusing method.

According to embodiments, the efficiency of generating extreme ultra violet radiation may be improved by using the plane mirror instead of the conventional beam splitter. Since the plane mirror is not a transmission type mirror, a problem, such as wavefront distortion or an increase in the pulsewidth, due to transmission, may not be caused even after laser beams are reflected twice. In this case, the problem, such as wavefront distortion of the laser beams or an increase in the pulsewidth, may be solved, unlike in a case where the laser beams are transmitted twice through a beam splitter. In addition, the efficiency of generating extreme ultra violet radiation may be increased by 20% or greater.

Additionally, laser beams weakly transmitted through the plane mirror may be sensed by sensor to control the position of one or more optical element in an optical path between the light source and the gas cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for generating extreme ultra violet radiation, the apparatus comprising:

a light source;

a first reflecting mirror on which source light emitted from the light source is incident;

a second reflecting mirror on which first reflected light reflected by the first reflecting mirror is incident;

a focus mirror on which second reflected light reflected by the second reflecting mirror is incident, the focus mirror reflecting third reflected light back to the second reflecting mirror; and a gas cell on which fourth reflected light reflected by the second reflecting mirror is incident.

2. The apparatus as claimed in claim 1, further comprising:

a first position sensor which senses a change in a position of first transmitted light generated when some of the first reflected light is transmitted through the second reflecting mirror;

a second position sensor which senses a change in a position of second transmitted light generated when some of the third reflected light is transmitted through the second reflecting mirror;

a first position adjusting apparatus configured to adjust the position of the first reflecting mirror; and a second position adjusting apparatus configured to adjust the position of the focus mirror.

3. The apparatus as claimed in claim 2, wherein an output of the first position sensor controls the second position adjusting apparatus and an output of the second position sensor controls the first position adjusting apparatus.

4. The apparatus as claimed in claim 2, wherein the first and second position sensors are positioned behind the second reflecting mirror.

5. The apparatus as claimed in claim 1, further comprising:

a position sensor which senses a change in a position of transmitted light generated when some light incident on the second reflecting mirror is transmitted therethrough; and a position adjusting apparatus configured to adjust the position at least one of the first reflecting mirror and the focus mirror in response to an output of the position sensor.

6. The apparatus as claimed in claim 1, wherein the light source emits a laser beam and the laser beam interacts with gas in the gas cell to emit extreme ultra violet radiation.

7. The apparatus as claimed in claim 6, wherein the gas includes one or more of Ne, Ar, Kr and Xe.

8. An apparatus for generating extreme ultra violet radiation, the apparatus comprising:

a reflecting mirror which receives light and provides reflected light forward and transmitted light rearward;

a focus mirror which receives the reflected light; and a position sensor which receives the transmitted light.

9. The apparatus as claimed in claim 8, further comprising a position adjusting apparatus which is formed to adjust the position of the focus mirror.

10. The apparatus as claimed in claim 9, wherein the position sensor controls the position adjusting apparatus.

11. An optical system for an apparatus for generating extreme ultra violet radiation, the optical system being between a light source and a gas cell, the optical system directing light from the light source onto the gas cell, the optical system comprising:

at least one reflecting mirror; and at least one focus mirror, wherein light incident on the gas cell has only been reflected in the optical system.

12. The optical system as claimed in claim 11, further comprising a position sensor that receives light transmitted from the at least one reflecting mirror.

13. The optical system as claimed in claim 12, further comprising a position adjusting apparatus configured to adjust a position of at least one of the at least one reflecting mirror and at least one focus mirror in accordance with an output of the position sensor.

14. The apparatus as claimed in claim 2, wherein the first position adjusting apparatus configured to adjust the position of the first reflecting mirror in accordance with the change in the position of at least one of the first transmitted light and the second transmitted light, and the second position adjusting apparatus configured to adjust the position of the focus mirror in accordance with the change in the position of at least one of the first transmitted light and the second transmitted light.

15. The apparatus as claimed in claim 14, wherein the first position adjusting apparatus configured to adjust the position of the first reflecting mirror in accordance with the change in the position of the second transmitted light, and the second position adjusting apparatus configured to adjust the position of the focus mirror in accordance with the change in the position of the first transmitted light.

* * * * *